(12) United States Patent
Nobeoka et al.

(10) Patent No.: US 8,373,835 B2
(45) Date of Patent: Feb. 12, 2013

(54) LIQUID CRYSTAL DISPLAY MODULE

(75) Inventors: Kensuke Nobeoka, Shizuoka (JP); Seiji Yamane, Tottori (JP); Kazuteru Asai, Tottori (JP)

(73) Assignee: Sony Corporation, Tokyo (JP)

( * ) Notice: Subject to any disclaimer, the term of this patent is extended or adjusted under 35 U.S.C. 154(b) by 304 days.

(21) Appl. No.: 12/906,309

(22) Filed: Oct. 18, 2010

(65) Prior Publication Data

US 2011/0102726 A1    May 5, 2011

(30) Foreign Application Priority Data

Oct. 29, 2009    (JP) ................. P2009-248526

(51) Int. Cl.
*G02F 1/1345*    (2006.01)
(52) U.S. Cl. ........................ 349/150; 361/789
(58) Field of Classification Search ............ 361/789; 349/149, 150
See application file for complete search history.

(56) References Cited

U.S. PATENT DOCUMENTS

| 7,212,413 B2* | 5/2007 | Chang et al. .................. 361/749 |
| 2009/0207368 A1* | 8/2009 | Chuang ......................... 349/150 |

FOREIGN PATENT DOCUMENTS

JP    2008-226965    9/2008

* cited by examiner

*Primary Examiner* — Mark Robinson
*Assistant Examiner* — Michael Inadomi
(74) *Attorney, Agent, or Firm* — K&L Gates LLP (57) ABSTRACT

A liquid crystal display module includes: a liquid crystal display panel; a backlight light source; a casing enclosing the liquid crystal display panel and the backlight light source; a first flexible printed wiring board electrically connected to the liquid crystal display panel and a second flexible printed wiring board connected to the backlight light source, the first flexible printed wiring board and the second flexible printed wiring board being led out from an exit formed in an identical side of the casing to an outside of the casing in a state of being superposed on each other and being bent to a rear surface side of the casing; and a connecting part for electrically connecting the second flexible printed wiring board to the first flexible printed wiring board, the connecting part being formed on the outside of the casing.

5 Claims, 4 Drawing Sheets

LIQUID CRYSTAL DISPLAY MODULE

CROSS REFERENCES TO RELATED APPLICATIONS

The present application claims priority to Japanese Priority Patent Application JP 2009-248526 filed in the Japan Patent Office on Oct. 29, 2009, the entire content of which is hereby incorporated by reference.

BACKGROUND

The present application relates to a liquid crystal display module, and particularly to a liquid crystal display module having a main flexible printed wiring (FPC) board and an FPC board for a light source which boards are electrically connected to each other on the rear surface of the liquid crystal display module.

A liquid crystal display module has features of light weight, small thickness, and low power consumption as compared with a CRT (Cathode Ray Tube), and is thus used for display in many electronic devices. A liquid crystal display module displays an image by changing the orientation of liquid crystal molecules aligned in a predetermined direction by an alignment film resulting from a rubbing process by an electric field and thus changing an amount of light passing through a liquid crystal layer. A source of light made incident on the liquid crystal layer includes extraneous light in a reflective type liquid crystal display device and a backlight in a transmissive type liquid crystal display device. A reflective type liquid crystal display device has an excellent power-saving characteristic and has an advantage of high visibility under extraneous light. A transmissive type liquid crystal display device has an advantage of high visibility in a dark environment. A transflective liquid crystal display device combining characteristics of both a reflective type liquid crystal display device and a transmissive type liquid crystal display device is also known. A transmissive type or a transflective type liquid crystal display device is now often used as a liquid crystal display device because of the advantage of high visibility in a dark environment.

Such a transmissive type or a transflective type liquid crystal display device has a backlight unit on the rear surface of a liquid crystal display panel. A display module housing the liquid crystal display panel and the backlight unit in a casing is mass-produced in a module manufacturing plant, and the display module is incorporated into various electronic devices in an electronic device manufacturing plant. The liquid crystal display panel is electrically connected with a first FPC board for driving the liquid crystal display panel. The backlight unit is connected with a second FPC board for supplying power to a light source. Japanese Patent Laid-Open No. 2008-226965 (hereinafter referred to as Patent Document 1) discloses an application of a liquid crystal display module whose second FPC board for a light source is connected to a first FPC board for driving in order to reduce the number of connectors and the number of terminals connected to an external electronic device (see Patent Document 1 and FIG. 3).

A side of the liquid crystal display panel connected with the first FPC board has a driver IC and many pieces of wiring formed thereon, and thus has a wide non-display region. As shown in FIG. 3 of Patent Document 1 below, an LED as a backlight light source is disposed so as to be superposed on the wide non-display region as viewed in a plan in order to miniaturize the liquid crystal display module. Because the backlight unit is on the rear surface side of the liquid crystal display panel, the second FPC board for the light source is present on the rear surface side of the first FPC board for driving. Thus, generally, in the liquid crystal display module having the LED as backlight light source, the second FPC board is electrically connected to the rear surface side of the first FPC board.

SUMMARY

In the liquid crystal display module disclosed in Patent Document 1 described above, when the liquid crystal display module is incorporated into an electronic device, for example, the first FPC board and the second FPC board may need to be greatly bent to the rear surface side of the liquid crystal display module depending on a position of connection between the first FPC board and the casing. However, when the first FPC board and the second FPC board are bent to the rear surface side of the liquid crystal display module in the constitution as shown in the above Patent Document 1, a part where an end part of the second FPC board is electrically connected to the first FPC board comes into contact with the rear surface side of the liquid crystal display module, so that the electric connection part may be damaged.

In addition, because both ends of a part where the first FPC board and the second FPC board are superposed on each other are in a fixed state, a difference occurs between the radii of curvature of the respective FPC boards when the FPC boards are bent to the rear surface side of the liquid crystal display module. Thus, when the first FPC board and the second FPC board are bent forcedly, a load is applied to the part of connection of the second FPC board to the first FPC board, and the part of connection of the second FPC board to the first FPC board may be damaged. In particular, because the first FPC board is wider than the second FPC board, the first FPC board has a strong force to restore itself from a bent state to an original state, and thus a heavy load continues to be applied to the part where the second FPC board is connected to the first FPC board. When work is performed to connect the first FPC board to an external control board of an electronic device or the like in such a state, the part where the second FPC board is connected to the first FPC board may be damaged.

The present embodiment has been made in view of the above problems. It is desirable to provide a liquid crystal display module that reduces external force applied to a part of electric connection between a main FPC board and an FPC board for a light source of the liquid crystal display module, the main FPC board and the FPC board for the light source being electrically connected to each other on the rear surface of the liquid crystal display module, and which thereby improves reliability of the connection part.

According to an embodiment, there is provided a liquid crystal display module including: a liquid crystal display panel; a backlight light source; a casing enclosing the liquid crystal display panel and the backlight light source; a first flexible printed wiring board electrically connected to the liquid crystal display panel and a second flexible printed wiring board connected to the backlight light source, the first flexible printed wiring board and the second flexible printed wiring board being led out from an exit formed in an identical side of the casing to an outside of the casing in a state of being superposed on each other and being bent to a rear surface side of the casing; and a connecting part for electrically connecting the second flexible printed wiring board to the first flexible printed wiring board, the connecting part being formed on the outside of the casing. The first flexible printed wiring board is disposed on an outer surface side of the second flexible printed wiring board on an exit side of the casing, the second flexible printed wiring board is disposed on an outer surface side of the first flexible printed wiring board at the connecting part, and the first flexible printed wiring board is fixed to a surface of the casing by a fixing member at a position corresponding to the connecting part.

In the liquid crystal display module according to the above-described embodiment, the first flexible printed wiring board electrically connected to the liquid crystal display panel and the second flexible printed wiring board connected to the backlight light source are led out from the exit formed in the identical side of the casing to the outside of the casing in a state of being superposed on each other, and are bent to the rear surface side of the casing, and the connecting part for electrically connecting the second flexible printed wiring board to the first flexible printed wiring board is formed on the outside of the casing. The second FPC board connected to the backlight light source is led out from the back side of an array substrate of the liquid crystal display panel (opposite side from a display surface) when the backlight light source is an LED, in particular. On the other hand, the first FPC board electrically connected to the liquid crystal display panel is led out from the surface side of the array substrate (display surface side). Thus, when the first FPC board and the second FPC board are led out from the identical side of the casing to the outside, the first FPC board is disposed on the outer surface side of the second FPC board.

In the liquid crystal display module according to the above-described embodiment, a state of superposition of the first FPC board and the second FPC board is changed between the exit of the casing and the connecting part, so that the second FPC board is disposed on the outer surface side of the first FPC board at the connecting part. Thus, according to the liquid crystal display module according to the above-described embodiment, even when the second FPC board and the first FPC board are bent to the rear surface side of the casing, the connecting part is not damaged by contact with the casing because the connecting part is not present on the rear surface side of the casing. In addition, electric connection between the second FPC board and the first FPC board can be made easily. Incidentally, the electric connection between the second FPC board and the first FPC board can be made by directly connecting a connecting terminal at an end of the second FPC board to a connecting terminal of the first FPC board by soldering so as to go over a level difference of the second FPC board, or by forming a through hole in the connecting terminal at the end of the second FPC board and soldering the connecting terminal at the end of the second FPC board to the connecting terminal of the first FPC board via the through hole.

In addition, in the liquid crystal display module according to the above-described embodiment, the first flexible printed wiring board is fixed to the surface of the casing by the fixing member at the position corresponding to the connecting part. Thus, even when the first FPC board is bent to connect the first FPC board to an external control board of an electronic device or the like, application of external force to the connecting part is suppressed. Thus, according to the liquid crystal display module according to the above-described embodiment, a liquid crystal display module having a highly reliable connecting part can be obtained.

Preferably, in the liquid crystal display module according to the above-described embodiment, the first FPC board has an opening, and the second FPC board is positioned on the outer surface side of the first FPC board at the connecting part by inserting the second FPC board into the opening.

When the opening is formed in the first FPC board, the superposition state can be changed easily from a state in which the second FPC board is positioned on the inner surface side of the first FPC board to a state in which the second FPC board is positioned on the outer surface side of the first FPC board, by passing the second FPC board through the opening.

In the liquid crystal display module according to the above-described embodiment, the opening can be a notch in a form of one of a right triangle, an isosceles triangle, an arc, and a square having a part of a side in a longitudinal direction of the first FPC board as a base.

When the opening formed in the first FPC board is a notch, the second FPC board can be easily inserted into the notch, so that the superposition state can be changed easily. Incidentally, as for the shape of the notch, the notch can take the form of one of a right triangle, an isosceles triangle, an arc, and a square, which can be selected and adopted as appropriate after consideration of the length of wiring that detours the notch part formed in the first FPC board, ease of processing, and the like.

In addition, in the liquid crystal display module according to the above-described embodiment, the second FPC board can have a detour not superposed on the first FPC board as viewed in a plan, whereby the second FPC board is positioned on the outer surface side of the first FPC board at the connecting part.

When an opening is formed in the first FPC board, wiring formed in the first FPC board needs to detour around the opening. In addition, because a large number of pieces of wiring are formed in the first FPC board, design of the wiring is complicated, and an existing first FPC board used commonly cannot be used as it is. However, the number of pieces of wiring of the second FPC board, which is intended for feeding to the backlight light source, is very small as compared with the first FPC board. Thus, according to the liquid crystal display module according to the above-described embodiment, the superposition state of the first FPC board and the second FPC board can be changed inexpensively and easily.

In addition, in the liquid crystal display module according to the above-described embodiment, the fixing member can be one of a double-faced tape, an adhesive, and a fixing jig.

Any of the fixing members can firmly fix the connecting part formed between the first FPC board and the second FPC board. Therefore a liquid crystal display module whose connecting part is improved in reliability is obtained. Incidentally, a double-faced tape is most desirable in consideration of ease of fixing the connecting part and cost.

Additional features and advantages are described herein, and will be apparent from the following Detailed Description and the figures.

DETAILED DESCRIPTION

The mode for carrying out the present application will hereinafter be described with reference to embodiments and drawings. However, the embodiments shown in the following are not intended to limit the present application to the embodiments described herein. The present application is equally applicable to embodiments resulting from various changes without departing from technical ideas shown in claims. Incidentally, in each drawing used for description in the present specification, each layer and each member are shown on a different scale so that each layer and each member have such a size as to be recognizable in the drawings, and are thus not necessarily shown in proportion to actual dimensions.

Embodiment

Figure 1:
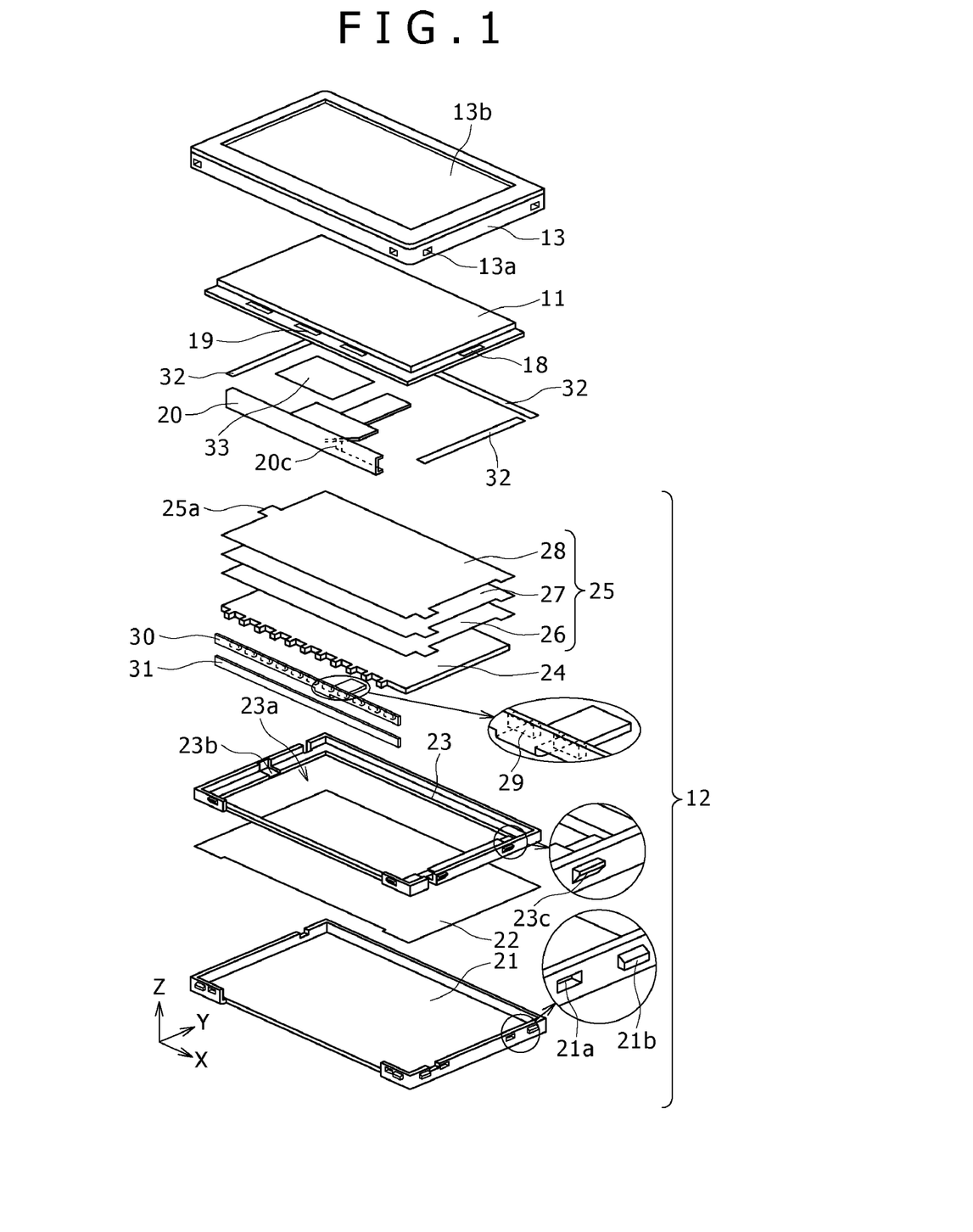
FIG. 1 is an exploded perspective view of a liquid crystal display module according to a present embodiment.
Figure 2A:
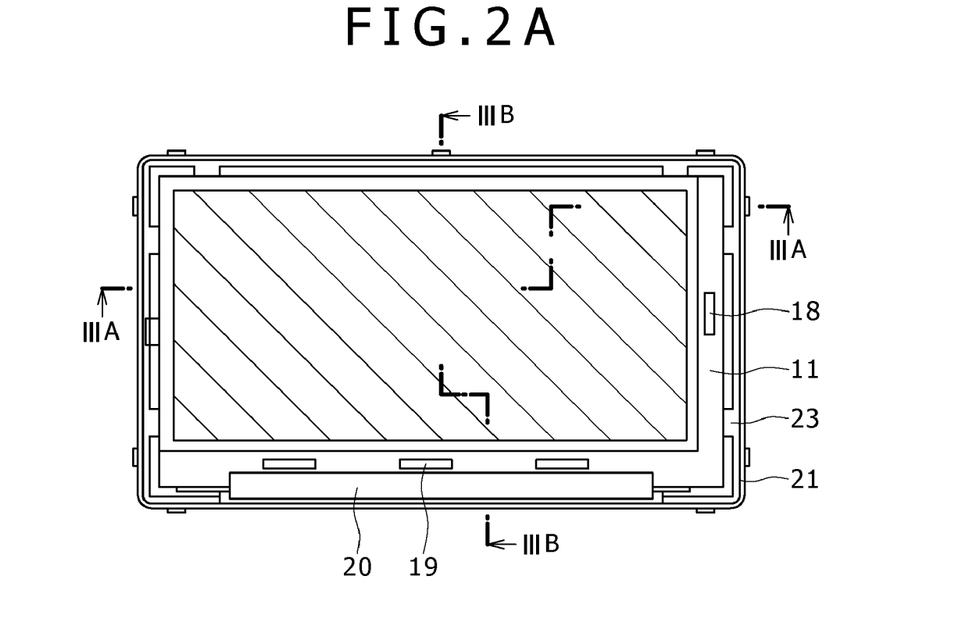
FIG. 2A is a plan view of the liquid crystal display module according to the embodiment with an outer frame removed.
Figure 2B:
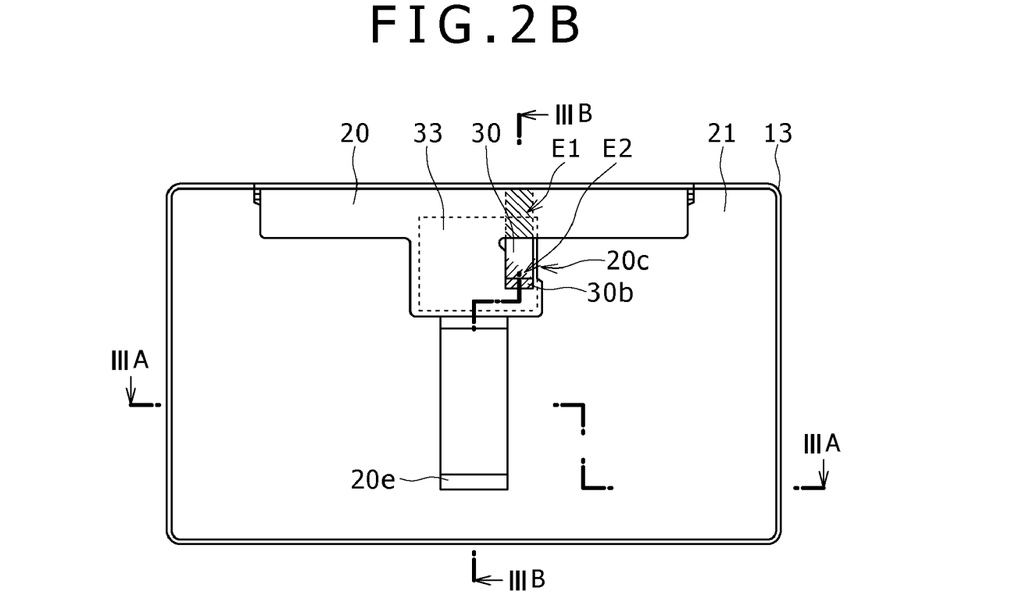
FIG. 2B is a bottom view of the liquid crystal display module.
Figure 3A:
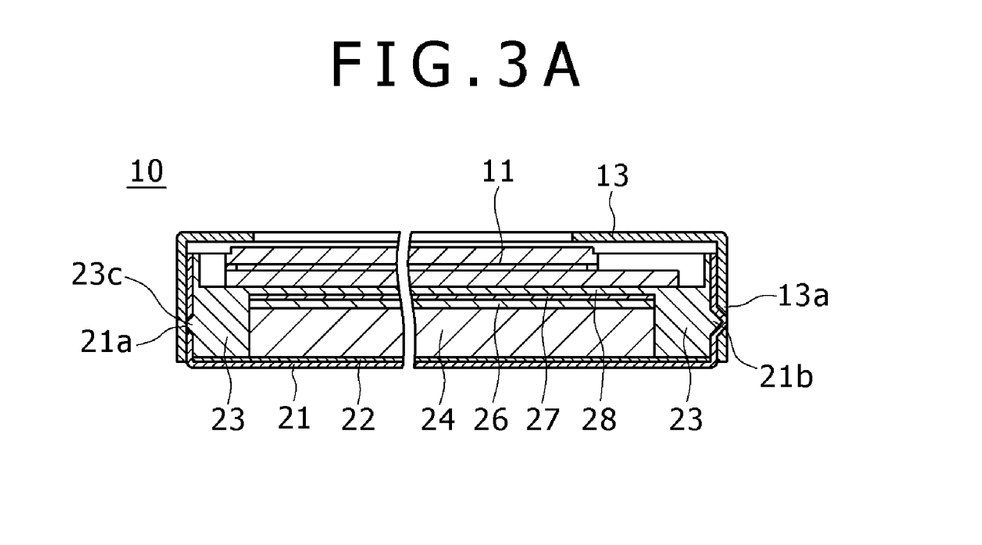
FIG. 3A is a sectional view taken along a line IIIA-IIIA in FIG. 2A.
Figure 3B:
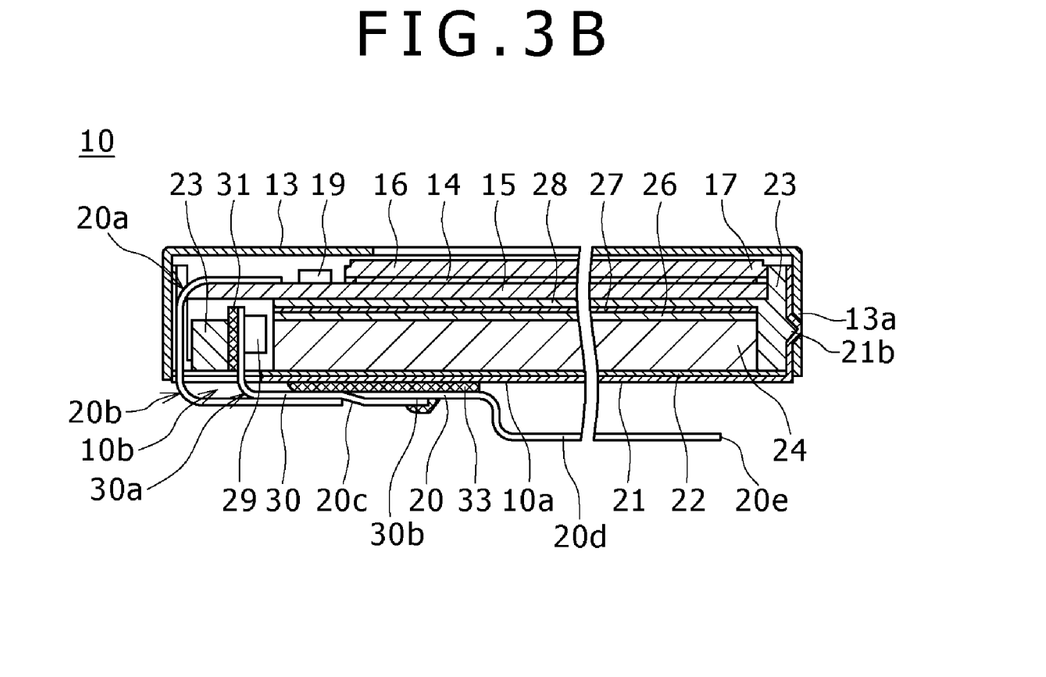
FIG. 3B is a sectional view taken along a line IIIB-IIIB in FIG. 2A.

A liquid crystal display module according to an embodiment will be described with reference to FIGS. 1 to 3B. The liquid crystal display module 10 according to the embodiment has for example a transmissive type liquid crystal display panel 11, a backlight section 12 disposed at the rear of the liquid crystal display panel 11, and an outer frame 13 housing the liquid crystal display panel 11 with the liquid crystal display panel 11 interposed between the backlight section 12 and the outer frame 13. As shown in FIG. 1 and FIG. 3B, the liquid crystal display panel 11 has a liquid crystal layer 14, an array substrate 15 and a color filter substrate 16 that sandwich the liquid crystal layer 14, a sealing member 17 enclosing the periphery of the liquid crystal layer 14 to prevent leakage of a liquid crystal, and a gate driver 18 and a source driver 19 for driving the liquid crystal display panel 11. In addition, the liquid crystal display panel 11 is connected with a driving first FPC board 20 for receiving a video signal from an external control board (not shown) and further supplying power.

As shown in FIGS. 1 to 3B, the backlight section 12 has a bottom case 21, a reflective sheet 22, and an inner frame 23 superposed on each other from the rear side of the liquid crystal display module 10. A light guide plate 24 and an optical sheet 25 are disposed in a central opening 23a of the inner frame 23. The optical sheet 25 in this case is composed of three sheets, which are a first diffusing sheet 26, a prism sheet 27, and a second diffusing sheet 28 from the rear side. A second FPC board 30 for a light source is attached to the inner frame 23 by a first double-faced tape 31 having excellent thermal conductivity such that LEDs 29 as a backlight light source are arranged so as to be opposed to a side surface as an incoming light surface of the light guide plate 24.

The bottom case 21 is for example formed by pressing a stainless plate having a thickness of 0.3 mm. A white reflective sheet 22 is laminated to the bottom case 21. The reflective sheet 22 is retained by a fit of a depression part and a projection part not shown in the inner frame 23. The reflective sheet 22 is used to reflect light from the LEDs 29 as backlight light source in the direction of the liquid crystal display panel 11.

The plurality of LEDs 29 emitting white light are disposed on the second FPC board 30. The light guide plate 24 is formed of transparent PMMA (polymethylmethacrylate). The light guide plate 24 is retained by a fit of a depression part and a projection part not shown in the inner frame 23. A side surface as an incoming light surface of the light guide plate 24 is processed into depressions and projections for uniformizing the brightness of incoming light from the LEDs 29. An upper surface as an outgoing light surface of the light guide plate 24 is processed into depressions and projections for condensing light in a desired direction.

The first diffusing sheet 26 and the second diffusing sheet 28 are to diffuse light emitted from the light guide plate 24 so as to uniformize the brightness of the emitted light. The prism sheet 27 is to condense light going in a Y-axis direction of FIG. 1 to a side in a Z-axis direction of FIG. 1 (side of the liquid crystal display panel 11). An extending part 25a formed on a side surface of the three-piece optical sheet 25 is fitted into a depression part 23b of the inner frame 23, whereby the three-piece optical sheet 25 is positioned.

The inner frame 23 is made of a synthetic resin material, and is formed by injection molding. As shown in FIG. 3A, a projection 23c on a side wall of the inner frame 23 is fitted into a rectangular hole 21a in a side wall of the bottom case 21, whereby the bottom case 21 and the inner frame 23 are mechanically coupled to each other. In addition, the liquid crystal display panel 11 is attached to the inner frame 23 by three strips of second double-faced tape 32. Further, the inner frame 23 is in the shape of a frame having a large opening 23a for passing light in the center of the frame. The outer frame 13 is for example formed by pressing a stainless plate. The outer frame 13 is in the shape of a frame having a large opening 13b as a display window in the center of the frame. The outer frame 13 is fitted to the bottom case 21 and houses the liquid crystal display panel 11 inside the outer frame 13. A projection 21b on a side wall of the bottom case 21 is fitted into a rectangular hole 13a in a side wall of the outer frame 13, whereby the bottom case 21 and the outer frame 13 are mechanically coupled to each other.

With the above-described constitution, light emitted from the LEDs 29 as backlight light source is diffused by the side surface of the light guide plate 24, reflected and diffused by the reflective sheet 22, increased in brightness in a predetermined direction by the light guide plate 24, diffused by the first diffusing sheet 26, condensed in a display direction by the prism sheet 27, diffused by the second diffusing sheet 28, and then applied to the rear surface of the liquid crystal display panel 11.

Constitutions of the first FPC board 20 and the second FPC board 30 will next be described. As shown in FIG. 3B, the driving first FPC board 20 is electrically connected to a non-display region in the vicinity of the source driver 19 on the array substrate 15 of the liquid crystal display panel 11, and has a first bent part 20a bent so as to extend out from an exit 10b provided in the rear surface 10a of the liquid crystal display module 10. In addition, the first FPC board 20 has a second bent part 20b bent so as to extend in parallel with the rear surface 10a of the liquid crystal display module 10 in the vicinity of the exit 10b of the liquid crystal display module 10. Incidentally, the rear surface 10a of the liquid crystal display module 10 refers to the rear side of a casing of the liquid crystal display module 10 (rear side of the bottom case 21 in this case).

A rear surface opposite from a surface to which the LEDs 29 are electrically connected in the second FPC board 30 for the light source is fixed to the inner frame 23 by the first double-faced tape 31. The second FPC board 30 extends out from the exit 10b provided in the rear surface of the liquid crystal display module 10, and has a first bent part 30a bent so as to extend in parallel with the rear surface 10a of the liquid crystal display module 10. The arrangement position of the second FPC board 30 is superimposed on the non-display region connected with the first FPC board 20 as viewed in a plan. Incidentally, the second FPC board 30 extends out from substantially the center of a longer side of the liquid crystal display module 10 (FIG. 2B). By thus setting the position where the second FPC board 30 extends out at the center of a side of the liquid crystal display module, when the number of LEDs 29 is increased, wiring connected to the LEDs 29 can be formed equally on the left and on the right.

In addition, as shown in FIG. 3B, the second FPC board 30 is situated on the inside of the first FPC board 20 connected to the liquid crystal display panel 11 within the liquid crystal display module 10 (side in contact with the rear surface 10a of the liquid crystal display module 10). Thus, at the exit 10b of the liquid crystal display module 10, the second FPC board 30 and the first FPC board 20 extend in parallel with the rear surface 10a of the liquid crystal display module 10 in a superposed state with the second FPC board 30 on the inside. Incidentally, the length of the second FPC board 30 can be made shortest when the arrangement position of the second FPC board 30 is thus superimposed on the first FPC board 20. If the second FPC board 30 is not superposed on the first FPC board 20, because the second FPC board 30 needs to be connected to the first FPC board 20 somewhere, the second FPC board 30 needs to be extended to a point where the second FPC board 30 is connected to the first FPC board 20. Therefore the second FPC board 30 needs to be lengthened. Lengthening the second FPC board 30 increases the manufacturing and processing cost of the second FPC board 30. However, superimposing the second FPC board 30 on the first FPC board 20 as in the present embodiment prevents such a problem. In addition, the superimposition is suitable also when there is a limited space on a drawing-out side in a case where the first FPC board 20 and the second FPC board 30 are drawn out from a shorter side of the liquid crystal display module 10 unlike the present embodiment, for example.

As shown in FIG. 2B, an opening 20c formed by a notch in the shape of a right triangle is provided in the first FPC board 20. As shown in FIG. 2B and FIG. 3B, the second FPC board 30 is inserted into the opening 20c, so that vertical positional relation between the first FPC board 20 and the second FPC board 30 is inverted. That is, in a part where the second FPC board 30 extends from the opening 20c, the first FPC board 20 is on the inside of the second FPC board 30 (side of the rear surface 10a of the casing). Thus, the second FPC board 30 has a first region E1 (a part of oblique lines slanting downward to the right in FIG. 2B) where the second FPC board 30 is on the inside of the first FPC board 20 and a second region E2 (a part of oblique lines slanting upward to the right in FIG. 2B) where the second FPC board 30 is on the outside of the first FPC board 20.

An end side of the second FPC board 30 is electrically connected to the first FPC board 20 at a connecting part 30b. The electric connection at the connecting part 30b is made by coupling a connecting terminal (not shown) on the end side of the second FPC board 30 and a connecting terminal (not shown) of the first FPC board 20, which are adjacent to each other with a level difference, to each other by solder as shown in FIG. 3B, for example, or is made by soldering the connecting terminal on the end side of the second FPC board to the connecting terminal of the first FPC board 20 via a through hole formed in the connecting terminal on the end side of the second FPC board 30, though not shown in the figures. In this case, a portion of a part present in the first region E1 of the second FPC board 30 adjacent to the opening 20c of the first FPC board 20 and most of a part of the first FPC board 20 which part is situated directly on the rear surface 10a side of the liquid crystal display module 10 are fixed by a heat-resistant third double-faced tape 33.

As shown in FIG. 3B, a connector extending part 20d on the end side of the first FPC board 20 which part is not fixed by the third double-faced tape 33 is bent and slightly separated from the rear surface 10a of the liquid crystal display module 10 as appropriate. A connecting terminal 20e to be connected to an external electronic device is provided at the end of the first FPC board 20 (see FIG. 2B and FIG. 3B).

Because the portion of the part present in the first region E1 of the second FPC board 30 adjacent to the opening 20c of the first FPC board 20 and most of the part of the first FPC board 20 which part is situated directly on the rear surface 10a side of the liquid crystal display module 10 are fixed by the heat-resistant third double-faced tape 33, a part where the first FPC board 20 and the second FPC board 30 are superposed on each other is not bent when the first FPC board 20 is connected to an external electronic device, for example. Thus, because no stress is applied to the part where the first FPC board 20 and the second FPC board 30 are superposed on each other, a breakage of the connecting part 30b between the first FPC board 20 and the second FPC board 30 can be suppressed.

Incidentally, the bending of the connecting part 30b between the first FPC board 20 and the second FPC board 30 can be reduced even when only an area in the vicinity of the connecting part 30b in the second region E2 is fixed by the third double-faced tape 33. In addition, the part where the first FPC board 20 and the second FPC board 30 are superposed on each other may be fixed not only by the third double-faced tape 33 but also by adhesion using an adhesive or mechanical fixing through addition of a fixing member, for example. In addition, when the part where the first FPC board 20 and the second FPC board 30 are superposed on each other is thus fixed, a region beyond the part, that is, the region of only the first FPC board 20 including the connecting terminal 20e has a steady length and a steady position. The present embodiment is therefore suitable also in a case where the length and the position of the first FPC board 20 are accurately specified when the first FPC board 20 is attached to an electronic device.

Further, in an existing liquid crystal display module, when a first FPC board 20 and a second FPC board 30 superposed on the rear surface side of the liquid crystal display module are bent, the second FPC board 30 is on the inside of the first FPC board 20 (on the rear surface 10a side of the liquid crystal display module 10). It is therefore difficult to perform solder connection work with the FPC boards bent. On the other hand, in the liquid crystal display module 10 according to the present embodiment, the part where the first FPC board 20 and the second FPC board 30 are superposed on each other is vertically inverted, so that the first FPC board 20 is on the inside. Soldering can therefore be performed easily while the first FPC board 20 and the second FPC board 30 remain bent.

In addition, in the liquid crystal display module 10 according to the present embodiment, superposition relation between the first FPC board 20 and the second FPC board 30 is vertically inverted by providing the opening 20c in the first FPC board 20. Thus, the superposition relation can be vertically inverted without the second FPC board 30 protruding from the first FPC board 20 as viewed in a plan, and exposed parts of the FPC boards can be reduced. In addition, even when the first FPC board 20 is bent for connection to an external electronic device or the like, the first FPC board 20 is easily bent by itself, and therefore the second FPC board 30 is not easily peeled off the third double-faced tape 33.

Examples of Modification

In the liquid crystal display module 10 according to the foregoing embodiment, a method is adopted which vertically inverts the superposition relation between the first FPC board 20 and the second FPC board 30 by providing the opening 20c formed by a notch in the shape of a right triangle in the first FPC board 20 and passing the second FPC board 30 through the opening 20c. However, the present application is not limited to this method. Accordingly, examples of modification of the liquid crystal display module 10 according to the embodiment will be described in the following with reference to FIGS. 4A to 4E. Incidentally, FIGS. 4A to 4E are diagrams showing principal parts of a first to a fifth example, respectively, of modification of the embodiment.

Figure 4A:
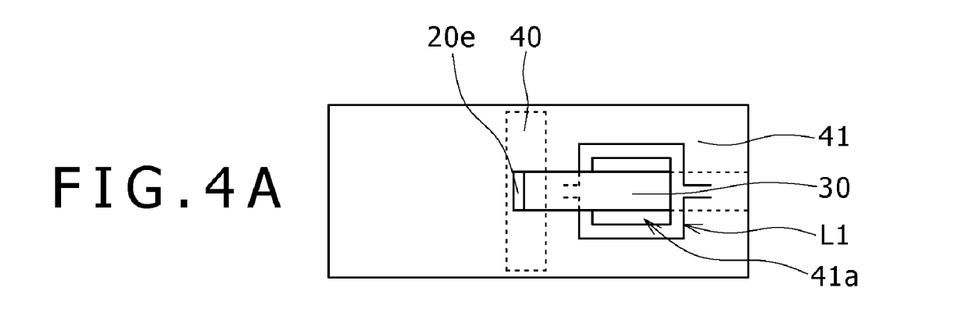
FIGS. 4A to 4E are schematic diagrams showing principal parts of bottom surfaces of a first to a fifth example, respectively, of modification of the present embodiment.

A liquid crystal display module according to the first example of modification shown in FIG. 4A has an opening 41a formed by a hole in the shape of a quadrangle rather than a notch in a first FPC board 41. The first FPC board 41 is fixed to the rear surface (not shown) of the liquid crystal display module by a third double-faced tape 40. The superposition relation between the first FPC board 41 and a second FPC board 30 is vertically inverted by passing the second FPC board 30 through the opening 41a. As shown in FIG. 4A, the first FPC board 41 according to the first example of modification can divide a detour of wiring L1 due to the opening 41a in both directions, and therefore reduce a range of variation in wiring length due to the detour. In addition, in the liquid crystal display module 10 according to the foregoing embodiment, the second FPC board 30 is bent sharply (a small radius of curvature) at the part where the superposition relation of the second FPC board 30 is vertically inverted on the center side of the first FPC board 20. In the first example of modification, however, because the opening 41a is a quadrangle, the second FPC board 30 can be passed through the opening 41a without being bent sharply (in a state of a large radius of curvature).

Incidentally, the opening 41a can be of a circular shape, an elliptic shape, or a rhombic shape. However, a quadrangle is most desirable in consideration of preventing an increase in length of the wiring L1 and of bending strength of the first FPC board.

Figure 4B:
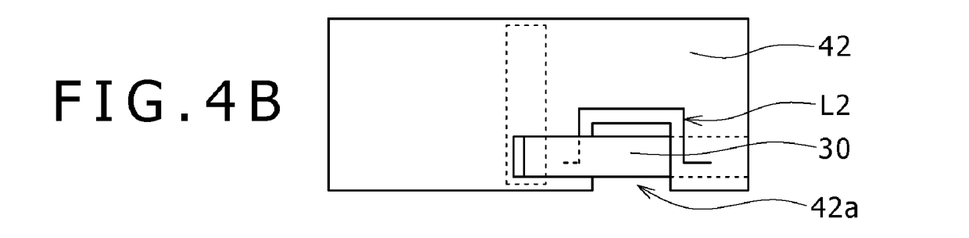

A liquid crystal display module according to the second example of modification shown in FIG. 4B has an opening 42a formed by a notch in the form of a rectangle in a first FPC board 42, and has wiring L2 disposed so as to detour around the opening 42a. The superposition relation between the first FPC board 42 and a second FPC board 30 is vertically inverted by passing the second FPC board 30 through the opening 42a. In the second example of modification, as in the first example of modification, the second FPC board 30 is not bent sharply. In addition, because the opening 42a is a notch, the work of passing the second FPC board 30 through the opening 42a can be made easier than in the first example of modification.

Figure 4C:
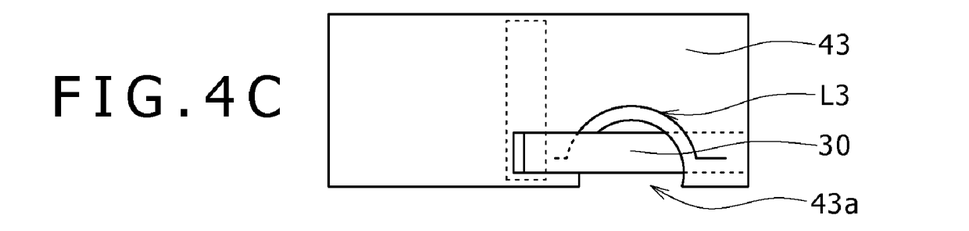

A liquid crystal display module according to the third example of modification shown in FIG. 4C has an opening 43a formed by a notch in the form of an arc in a first FPC board 43, and has wiring L3 disposed so as to detour around the opening 43a. The superposition relation between the first FPC board 43 and a second FPC board 30 is vertically inverted by passing the second FPC board 30 through the opening 43a. In the third example of modification, the wiring L3 that detours around the opening 43a can be in the form of an arc. Thus, as compared with the first and second examples of modification, because the wiring does not need to be arranged in a state of being bent at a sharp angle, the possibility of disconnection at bent parts of the wiring can be reduced.

Figure 4D:
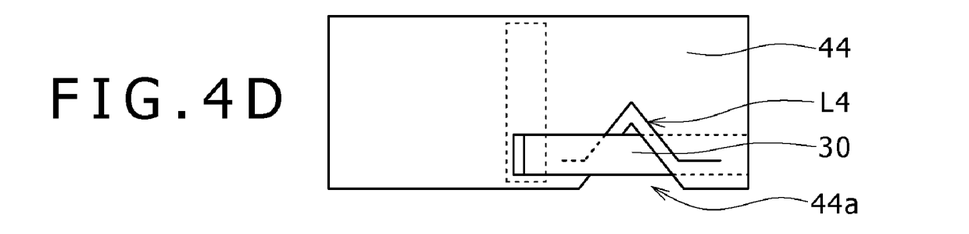

A liquid crystal display module according to the fourth example of modification shown in FIG. 4D has an opening 44a formed by a notch in the form of an isosceles triangle in a first FPC board 44, and has wiring L4 disposed so as to detour around the opening 44a. The superposition relation between the first FPC board 44 and a second FPC board 30 is vertically inverted by passing the second FPC board 30 through the opening 44a. In the fourth example of modification, the wiring L4 made to detour around the opening 44a can be formed by two shortest straight lines, and therefore the length of the wiring can be shortened as compared with the third example of modification.

Figure 4E:
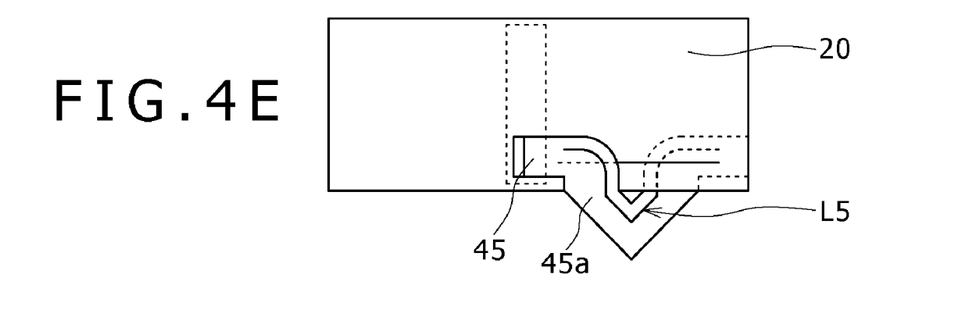

A liquid crystal display module according to the fifth example of modification shown in FIG. 4E does not have an opening in a first FPC board 20, but has a detour 45a not superposed on the first FPC board 20 in a second FPC board 45, and has wiring L5 disposed so as to detour around the wiring L5 by the detour 45a. In this case, the detour 45a is formed in the shape of an isosceles triangle so as to shorten the length of the wiring L5, and makes the second FPC board 45 superposed on the upper and lower surfaces of the first FPC board 20 communicate. Thus providing the detour 45a in the second FPC board 45 makes it possible to avoid forming an opening in the first FPC board 20 while achieving similar effects to those of the cases where an opening is provided in the first FPC board 20.

It suffices to select and adopt a desirable configuration of the embodiment and the first to fifth examples of modification described above as appropriate to make the most of respective features of the embodiment and the first to fifth examples of modification.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A liquid crystal display module comprising:
a liquid crystal display panel;
a backlight light source;
a casing enclosing said liquid crystal display panel and said backlight light source;
a first flexible printed wiring board electrically connected to said liquid crystal display panel and a second flexible printed wiring board connected to said backlight light source, the first flexible printed wiring board and the second flexible printed wiring board being led out from an exit formed in an identical side of said casing to an outside of said casing in a state of being superposed on each other and being bent to a rear surface side of said casing; and
a connecting part for electrically connecting said second flexible printed wiring board to said first flexible printed wiring board, the connecting part being formed on the outside of said casing;
wherein said first flexible printed wiring board is disposed on an outer surface side of said second flexible printed wiring board on an exit side of said casing,
said second flexible printed wiring board is disposed on an outer surface side of said first flexible printed wiring board at said connecting part, and
said first flexible printed wiring board is fixed to a surface of said casing by a fixing member at a position corresponding to said connecting part.
2. The liquid crystal display module according to claim 1, wherein said first flexible printed wiring board has an opening, and said second flexible printed wiring board is positioned on the outer surface side of said first flexible printed wiring board at said connecting part by inserting said second flexible printed wiring board into said opening.

3. The liquid crystal display module according to claim 2, wherein said opening is a notch in a form of one of a right triangle, an isosceles triangle, an arc, and a square having a part of a side in a longitudinal direction of the first flexible printed wiring board as a base.

4. The liquid crystal display module according to claim 1, wherein said second flexible printed wiring board has a detour not superposed on said first flexible printed wiring board as viewed in a plan, whereby said second flexible printed wiring board is positioned on the outer surface side of said first flexible printed wiring board at said connecting part.

5. The liquid crystal display module according to claim 1, wherein said fixing member is one of a double-faced tape, an adhesive, and a fixing jig.

* * * * *